US011942001B1

(12) United States Patent
Lidell

(10) Patent No.: US 11,942,001 B1
(45) Date of Patent: Mar. 26, 2024

(54) BANNER STAND

(71) Applicant: THRONES LLC, Orange, CA (US)

(72) Inventor: Clifford Lidell, Orange, CA (US)

(73) Assignee: Thrones LLC, Orange, CA (US)

( * ) Notice: Subject to any disclaimer, the term of this patent is extended or adjusted under 35 U.S.C. 154(b) by 0 days.

(21) Appl. No.: 18/489,355

(22) Filed: Oct. 18, 2023

(51) Int. Cl.
*G09F 15/00* (2006.01)

(52) U.S. Cl.
CPC ...... *G09F 15/0062* (2013.01); *G09F 15/0012* (2013.01)

(58) Field of Classification Search
CPC .......................... G09F 15/0062; G09F 15/0012
See application file for complete search history.

(56) References Cited

U.S. PATENT DOCUMENTS 1,406,916 A * 2/1922 Arnold ................ G09F 15/0006 40/606.17
4,842,035 A * 6/1989 Thompson ............ E04B 2/7431 160/351
4,866,866 A * 9/1989 Rotter ................ G09F 15/0062 40/610
4,906,503 A * 3/1990 De La Cruz ........ G09F 15/0018 40/604
5,083,390 A * 1/1992 Edman ...................... G09F 7/18 40/607.1
5,842,939 A * 12/1998 Pui ....................... A63B 63/004 273/400
6,161,320 A * 12/2000 Peterson ............. G09F 15/0025 40/605
7,213,356 B2 * 5/2007 Haggard, Jr. ......... G09F 21/042 40/607.1
7,337,567 B2 3/2008 Fritsche et al.
7,546,992 B1 * 6/2009 Cappolina ........... G09F 15/0012 40/604
8,006,420 B2 8/2011 Merner et al.
8,322,060 B2 12/2012 Parizek et al.
10,217,388 B1 * 2/2019 Alkas ..................... A47B 57/30
10,529,257 B1 * 1/2020 Peelgrane ................. G09F 3/02
2001/0003878 A1 * 6/2001 Dawkins ................. G09F 17/00 40/603
2005/0200951 A1 * 9/2005 Redmon ................. G09F 19/18 359/443
2006/0060310 A1 * 3/2006 Haugen ..................... G09F 7/18 160/135

(Continued)

*Primary Examiner* — Gary C Hoge
(74) *Attorney, Agent, or Firm* — Nolan Heimann LLP; Adam Diament

(57) ABSTRACT

A banner stand for connecting a banner is disclosed. The banner stand includes a frame structure having a plurality of poles and a plurality of coupling joints. The plurality of poles and the plurality of coupling joints interconnect forming a banner receiving area. Each of the coupling joints has a plate facing the banner receiving area. Each plate has a hole. The frame structure includes an elastic cord drawn through the plurality of poles and the plurality of coupling joints to maintain a sequential order. The banner stand includes spike members connecting at the bottom of the frame structure. The spike members go into the ground and help to position the frame structure in an upright position. The banner receiving area receives the banner. The frame structure includes a banner attachment cord drawn through the holes in the plates for connecting the banner.

20 Claims, 10 Drawing Sheets

(56) References Cited

U.S. PATENT DOCUMENTS

| | | | | |
|---|---|---|---|---|
| 2006/0137232 | A1* | 6/2006 | Mann | E04H 15/40 40/610 |
| 2006/0156601 | A1* | 7/2006 | Haggardm, Jr. | G09F 17/00 40/604 |
| 2006/0185206 | A1* | 8/2006 | Du Bose | G09F 7/18 40/610 |
| 2006/0207143 | A1* | 9/2006 | Brown | G09F 15/0025 40/610 |
| 2014/0135153 | A1* | 5/2014 | Wartenweiler | A63B 71/023 473/478 |
| 2015/0057113 | A1* | 2/2015 | Phillips | A63B 63/004 473/478 |
| 2017/0053571 | A1* | 2/2017 | Wormser | G09F 15/0025 |
| 2020/0226962 | A1* | 7/2020 | Casper | G09F 19/22 |
| 2023/0033926 | A1* | 2/2023 | Liu | G09F 15/0062 |

* cited by examiner

BANNER STAND

CROSS-REFERENCE TO RELATED APPLICATIONS

None.

FIELD OF THE DISCLOSURE

The present invention relates to a banner stand, and more specifically, to a collapsible banner stand with interlocking poles and coupling joints.

BACKGROUND OF THE INVENTION

Banner stands, often used for advertising, promotions, events, and presentations, are essential for displaying banners prominently. Traditionally, banner stands comprise a frame or pole-based structure wherein a banner can be suspended or attached.

Several banner stands have been disclosed in the past. One such example is disclosed in a U.S. Pat. No. 8,006,420, entitled "Retractable banner display stand" ("the '420 Patent"). The '420 Patent discloses a retractable banner stand that includes a canister with an extendable banner having an ad and/or message thereon viewable when the banner is extended. A kit comprised of a pair of end caps with foldable legs and a pole support are releasably engaged to the canister and can be removed without tools. The kit can be releasably engaged to a second canister, without tools, with the second canister containing a second banner with a different (or new) ad and/or message to thus facilitate changing banners.

Another example is disclosed in a U.S. Pat. No. 8,322,060, entitled "Retractable two-sided banner stand" ("the '060 Patent"). The '060 Patent discloses a retractable double-sided banner stand having a base, two upright posts, a crossbar, and a single banner with graphic image(s) disposed on both sides of the banner. The base generally includes a housing, two housing end cap assemblies, a single core, and a retracting mechanism. The banner is wound around the core, and the retracting mechanism unwinds and winds the banner with respect to the core. The leading edge of the banner is attached to the crossbar, which is wider than the width of the banner. The banner stand has an erect upright mode for displaying the images(s), and a collapsed mode for transporting the banner stand. In the erect mode, the upright posts are retained in the base by means of a quick-release locking mechanism, the banner extends upwardly from the base, and the crossbar engages with, and is supported by, the upper portion of each of the upright posts.

Yet another example is disclosed in a U.S. Pat. No. 7,337,567, entitled "Retractable banner stand with curvature means" ("the '567 Patent"). The '567 Patent discloses a retractable banner stand having a banner, a support base, a mast, a retracting mechanism, and a means for imparting a curvature in the horizontal plane on the banner. Typically, a cross member will be provided for supporting the banner in an extended upright position and typically the base will be a housing that included the retracting mechanism. The means for imparting a curvature may comprise a pair of elongate forms each with a banner engaging area that has a curved surface. The elongate forms can be resiliently flexible to repeatably provide and release the curved surface upon set-up and take-down. Various means for holding the resiliently flexible form in place include hinged spacers, slidable spacers, hinged form, or slidable form connected to the base. Alternatively, the curved surface may be rigid and insertable into engagement with the banner.

Although the traditional banner stands are useful, there are several problems and inconveniences associated with them. For instance, many conventional banner stands are susceptible to tipping over or collapsing under certain conditions, such as windy environments or when nudged accidentally. This not only reduces the efficacy of the display but also poses a safety risk.

Traditional banner stands, especially the more stable versions, tend to be bulky and rigid. This makes them challenging to transport, set up, or store. Portability is a significant concern for users who frequent trade shows, exhibitions, and events. Further, many banner stands can't support banners beyond a specific weight or size without compromising their structure or stability. This limitation restricts users from using heavy or larger banners, thus limiting their display options.

Thus, there remains a continuing need for improved banner stands.

BRIEF SUMMARY OF THE PRESENT INVENTION

It is an object of the present invention to provide a collapsible banner stand having a frame structure with a series of hollow poles and coupling joints that interlock with one another.

It is another object of the present invention to provide a banner stand having poles and coupling joints connected in series, which are maintained in a sequential order by a continuous elastic cord that runs through them.

It is another object of the present invention to provide a banner stand having spike members that are closest to the ground that interlock with free standing poles and help stand the frame structure in an upright position.

In one aspect of the present invention, the invention provides a banner stand that includes a frame structure having a plurality of poles and a plurality of coupling joints or connecting members or connecting brackets for connecting a banner. The poles make up its fixed shape, have varying lengths and are fused to coupling joints on one end. Each pole indicates a telescopic pole having an outer sleeve and an inner sleeve. On the other hand, the inner sleeve interlocks with the coupling joint of the next sequential piece. This series of interlocking poles, inner sleeves, and joints repeats until the frame structure completes.

The inner sleeve extends from the outer sleeve. The inner sleeve on one end of each pole is a 3" long and is half inserted into the pole itself, with the other half exposed. Housed within the half pole that is exposed is a metal spring member attached to a button that protrudes through a small hole. The spring member holds the button in place while also able to compress when pushed. The coupling joint has a small plate attached to its side. Each of the plates has a plate hole in the center, and is uniquely positioned in a way that all plates point toward a singular center point once the frame structure is constructed. The open end of each coupling joint features a small coupling joint hole so that when the corresponding inner sleeve of the next sequential piece is placed inside of it, the spring button protrudes out and locks two pieces together in a specific orientation.

Further, the frame structure includes an elastic cord drawn through the plurality of poles and the plurality of coupling joints to maintain a sequential order. The banner stand includes spike members connecting at the bottom of the frame structure. The spike members go into the ground and help to position the frame structure in an upright position. The banner receiving area receives the banner. The frame structure includes a banner attachment cord drawn through the holes in the plates for connecting the banner.

In another aspect, the banner stand includes support members. The support members connect in between the frame structure and the spike members.

In one advantageous feature of the present invention, the frame structure is uninstalled and collapsed while maintaining the plurality of poles and the plurality of coupling joints in the series with the help of the elastic cord. Further, the spike members help to keep the banner stand closest to the ground and prevents the freestanding frame structure from tipping over or collapsing under certain conditions, such as windy environments or when nudged accidentally.

In another advantageous feature of the present invention, the banner stand offers an easy way to hang banners and signs. The banner stand provides a lightweight yet durable construction, which is strong enough to hold its shape outdoors, and also compact enough to be easily carried and stored in small places. The interlocking poles and the coupling joints are held in sequential order by the elastic cord. As a result, there's no need for any guesswork of how to install or uninstall them, or fear of losing them. In one example, the banner stand can be used to connect a standard size 5'×3' vinyl banner typically used for sports. The plates having holes can be used to secure other types of signs.

DETAILED DESCRIPTION OF EMBODIMENTS

Figure 1:
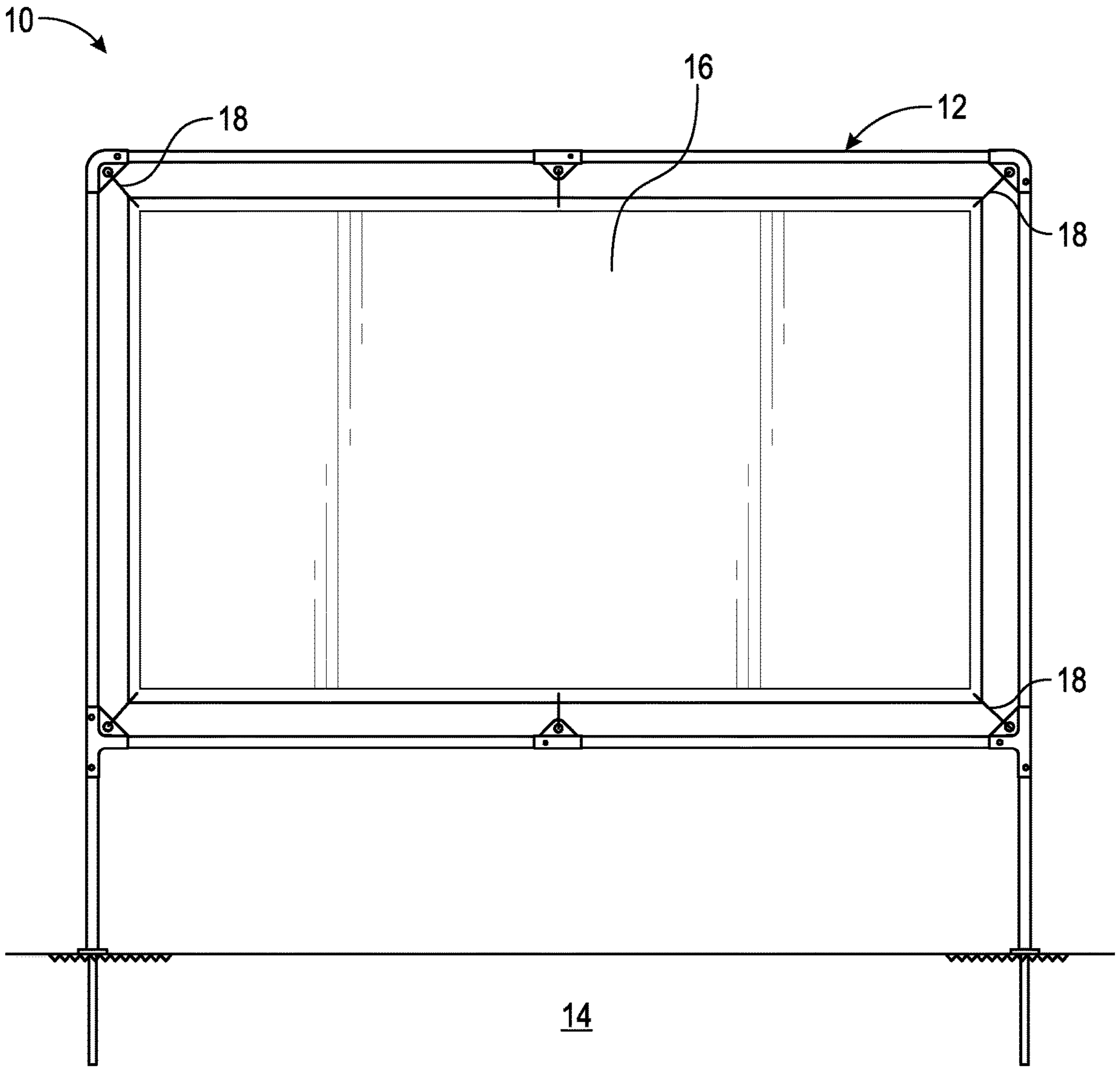
FIG. 1 is an environment in which a banner stand implements, in accordance with one embodiment of the present invention.

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. The numbers, ratios, percentages, and other values may include those that are ±5%, ±10%, ±25%, ±50%, ±75%, ±100%, ±200%, ±500%, or other ranges that do not detract from the spirit of the invention. The terms about, approximately, or substantially may include values known to those having ordinary skill in the art. If not known in the art, these terms may be considered to be in the range of up to ±5%, ±10%, or other value higher than these ranges commonly accepted by those having ordinary skill in the art for the variable disclosed. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein. All patents, patent applications and non-patent literature cited through this Specification are hereby incorporated by reference in their entireties. References cited in an Information Disclosure Statement should not be construed as an admission that the cited reference comes from an area that is analogous or directly applicable to the invention, but rather that the reference is being cited out of an abundance of caution.

Turning to the Figures, FIG. 1 shows an environment 10 in which a banner stand 12 implements, in accordance with one embodiment of the present invention. Banner stand 12 mounts on a surface 14 such as a ground and helps to hold a banner 16. Banner 16 connects to banner stand 12 via banner connecting members 18. An example of banner connecting member 18 includes, but not limited to, a zip tie, string, bungee cord, rope, etc.

Figure 2:
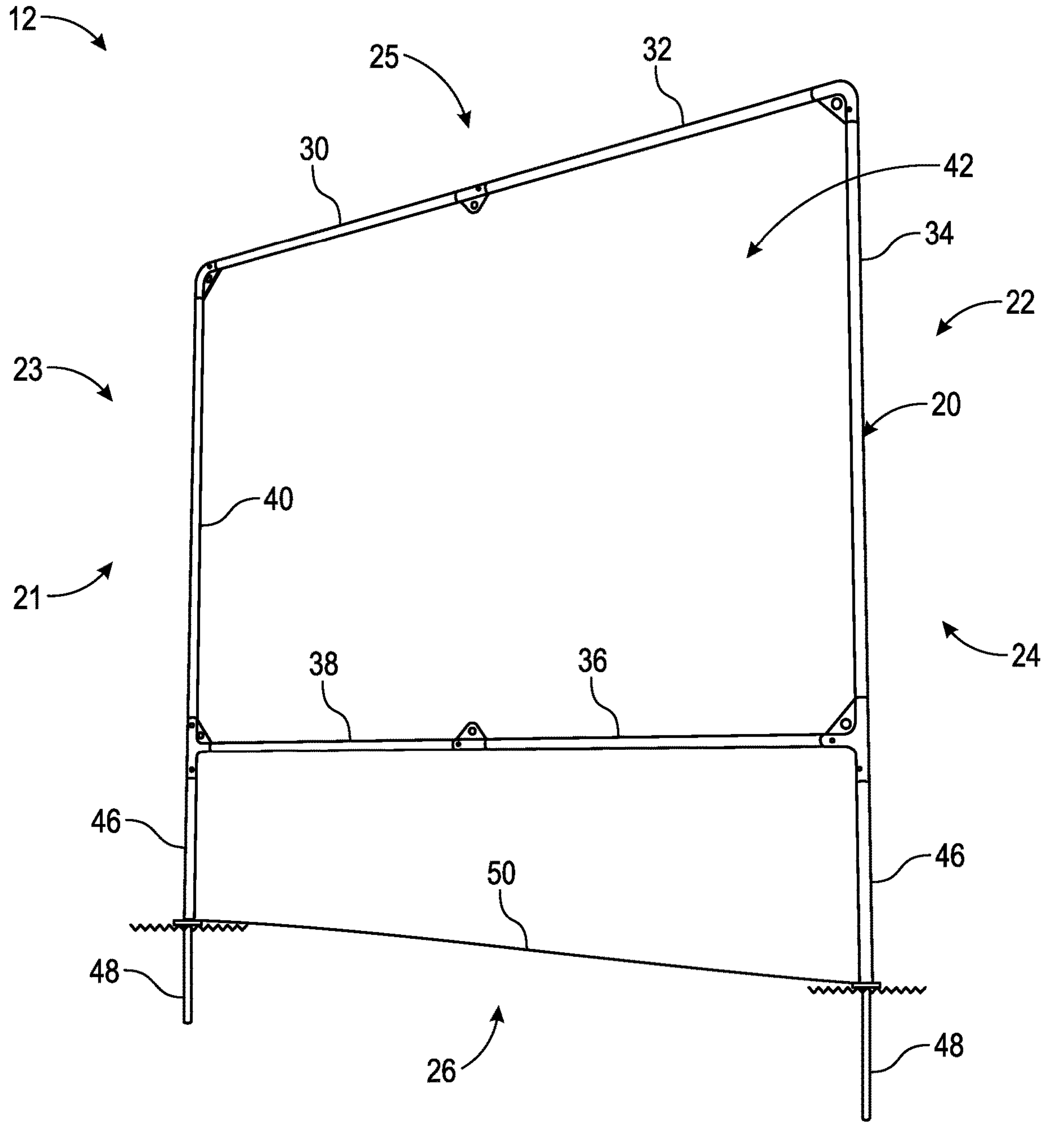
FIG. 2 is a perspective view of the banner stand, in accordance with one embodiment of the present invention.
Figure 3:
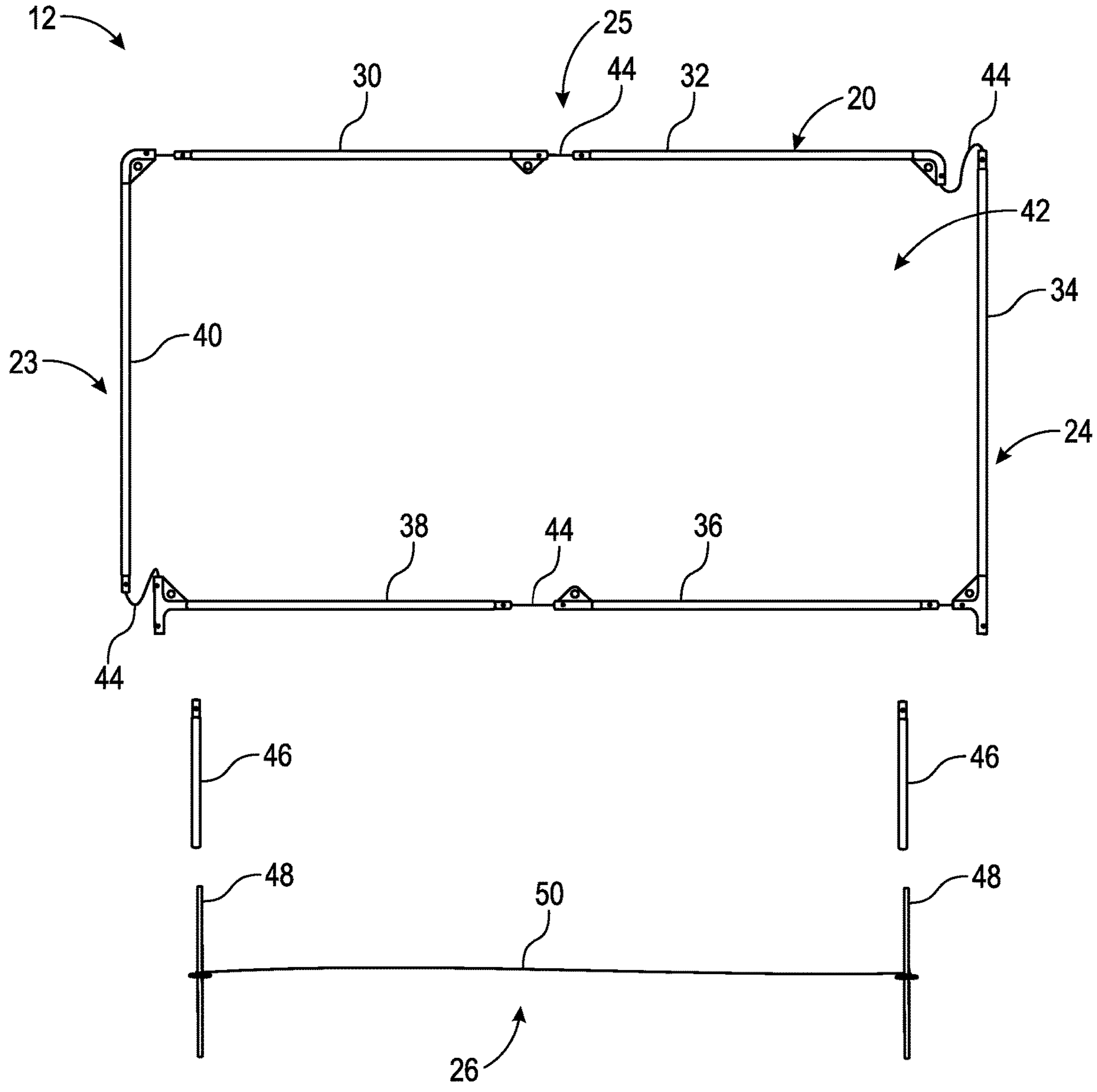
FIG. 3 is an exploded view of the banner stand, in accordance with one embodiment of the present invention.

FIG. 2 shows a side perspective view of banner stand 12, in accordance with one embodiment of the present invention. Further, FIG. 3 shows a front exploded view of banner stand 12. Banner stand 12 includes a frame structure 20 made of metal, hard plastic, wood or any other suitable material. Frame structure 20 has a first end 21, a second end 22, a first side 23, a second side 24, a top end 25, and a bottom end 26. First end 21 indicates a front end and second end 22 indicates a rear end, or vice versa of frame structure 20. First side 23 indicates a right side and second side 24 indicates a left side, or vice versa of frame structure 20. Frame structure 20 includes a first pole 30, a second pole 32, a third pole 34, a fourth pole 36, a fifth pole 38 and a sixth pole 40. First pole 30, second pole 32, third pole 34, fourth pole 36, fifth pole 38 and sixth pole 40 form a banner receiving area 42 at the center for receiving banner 16. In the present invention, frame structure 20 includes a banner attachment cord 44 drawn through each of first pole 30, second pole 32, third pole 34, fourth pole 36, fifth pole 38 and sixth pole 40. Banner attachment cord 44 indicates an elastic cord drawn through first pole 30, second pole 32, third pole 34, fourth pole 36, fifth pole 38 and sixth pole 40 to hold them in a sequential order. In one example, elastic cord 44 measures approximately 75% of the collective length of the poles that make up frame structure 20 and runs each piece in a specific sequential order. This ensures individual pieces in frame structure 20 remain in their proper order, as well as bound the pieces together into a compact shape when deconstructed. Each end of elastic cord 44 is tied to the other to form a self-completing loop.

Further, frame structure 20 encompasses support members 46 that act as legs for frame structure 20. Support members 46 extend from third pole 34 and fifth pole 38 and help to position frame structure 20 at a desired height from surface 14. Further, support members 46 connect to spike members 48. Spike members 48 position in surface 14 and act as base for banner stand 12. In one example, support members 46 connect via a cable 50 to keep them in place. The cable 50 connects the spike members 48, The cable 50 has a predetermined length to set a maximum distance between the spike members 48.

Figure 4:
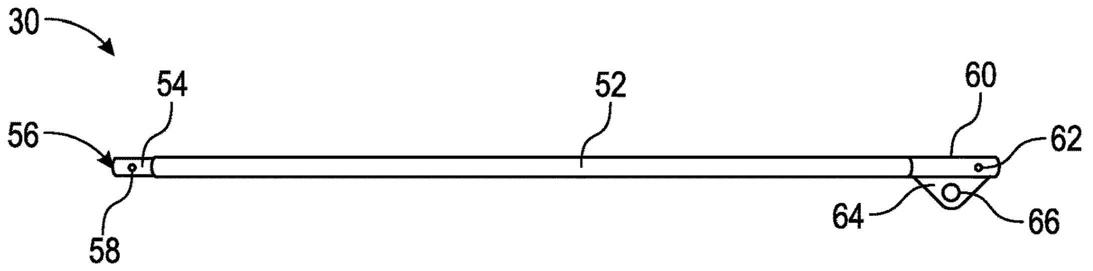
FIG. 4 is a front view of a first pole of the banner stand, in accordance with one embodiment of the present invention.
Figure 5A:
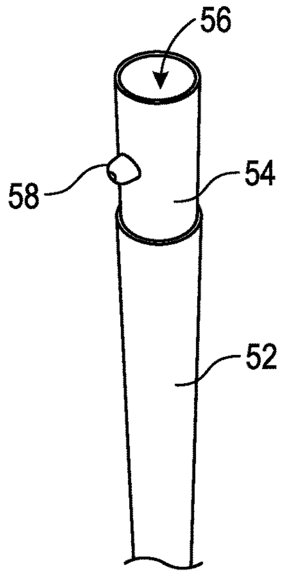
FIG. 5A and FIG. 5B illustrate a side perspective view and a top perspective view, respectively of the first pole (partial), in accordance with one embodiment of the present invention.
Figure 5B:
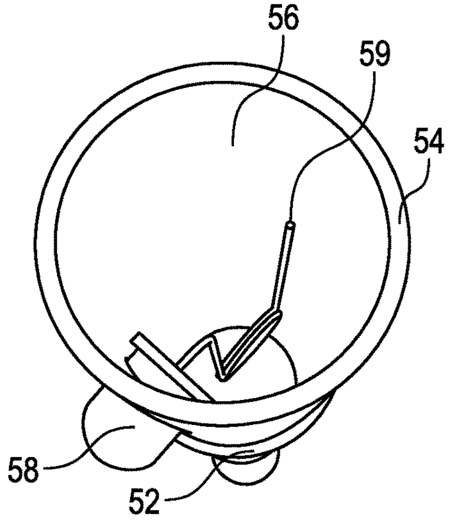

Now referring to FIG. 4, constructional features of first pole 30 are explained, in accordance with one embodiment of the present invention. First pole 30 is made of metal, hard plastic, or any other suitable material. First pole 30 indicates a telescopic pole having a first outer sleeve 52 and a first inner sleeve 54. First inner sleeve 54 has a slightly smaller diameter than first outer sleeve 52. FIG. 5A shows a partial side perspective view of first pole 30 having first outer sleeve 52 and first inner sleeve 54. First pole 30 presents a first draw hole 56 in first outer sleeve 52 and first inner sleeve 54 for drawing banner attachment cord 44. Further, first inner sleeve 54 includes a first button 58 extending from its surface. Here, first button 58 connects to a spring member 59 positioned in first inner sleeve 54. FIG. 5B shows a top perspective view of first inner sleeve 54 having first button 58 connected to spring member 59. In one example, first inner sleeve 54 is a 3" long and half insert into first outer sleeve 52, with other the half exposed. The exposed half incorporates spring member 59 that attaches to first button 58. As can be seen from FIG. 5B, first button 58 protrudes out through a hole in first inner sleeve 54. Spring member 59 holds first button 58 in place while also being able to compress when pushed.

Further, first pole 30 includes a first coupling joint or first connecting members or first connecting brackets 60. First coupling joint 60 receives a distal end of first outer sleeve 52 at one end and includes a first coupling joint hole 62 at other end. In one example, first outer sleeve 52 is permanently fused to first coupling joint 60 at one distal end. Further, first coupling joint 60 includes a first plate 64 extending from the surface of first coupling joint 60 facing downwards. As can be seen from FIG. 4, first plate 64 includes a first plate hole 66. First plate hole 66 is used to connect banner 16 with the help of banner connecting members 18. As can be seen from FIG. 2, first plate 64 having first plate hole 66 positions facing a singular center point of frame structure 20.

Figure 6:
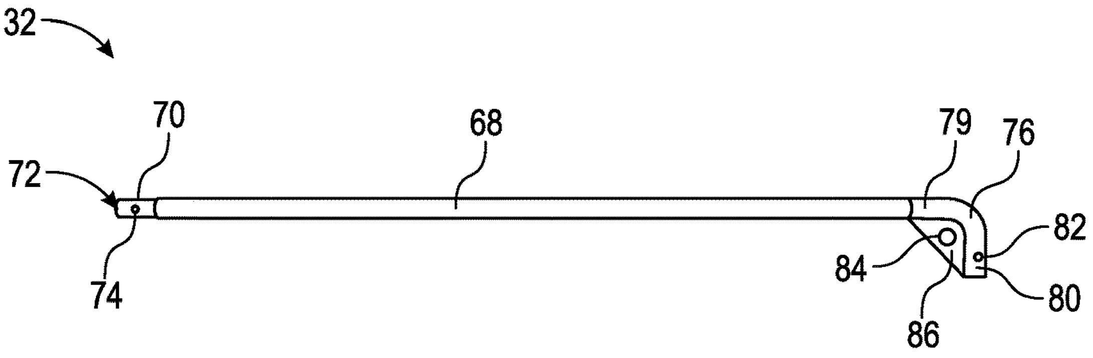
FIG. 6 is a front view of a second pole of the banner stand, in accordance with one embodiment of the present invention.

FIG. 6 shows an enlarged view of second pole 32, in accordance with one embodiment of the present invention. Second pole 32 includes a second outer sleeve 68 and a second inner sleeve 70. Second inner sleeve 70 has a slightly smaller diameter than second outer sleeve 68. Second pole 32 presents a second draw hole 72 in second outer sleeve 68 and second inner sleeve 70 for drawing banner attachment cord 44. Further, second inner sleeve 70 includes a second button 74 extending from its surface. Second button 74 (not shown, similar to first button 58) positions at second inner sleeve 70. At the other end, second pole 32 includes a second coupling joint 76. Here, second coupling joint 76 comes in a curved configuration and has a first end 79 and a second end 80. The first end 79 connects to second outer sleeve 68. At second end 80, second coupling joint 76 includes a second coupling joint hole 82. Further, second coupling joint 76 includes a second plate 84 extending from the surface of second coupling joint 76 facing inwards. Second plate 84 includes a second plate hole 86. Second plate hole 86 is used to connect banner 16 with the help of banner connecting members 18.

Figure 7:
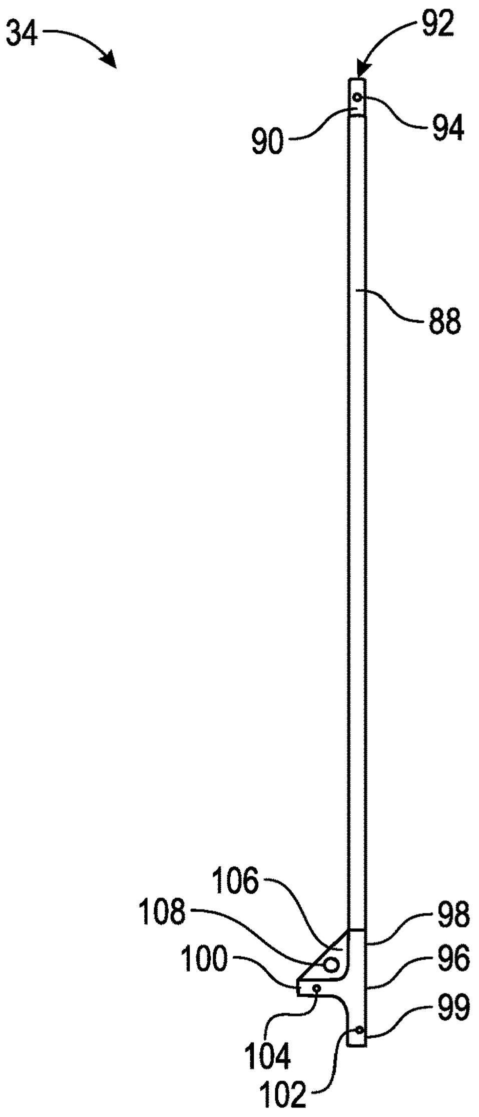
FIG. 7 is a front view of a third pole of the banner stand, in accordance with one embodiment of the present invention.

FIG. 7 shows an enlarged view of third pole 34, in accordance with one embodiment of the present invention. Third pole 34 includes a third outer sleeve 88 and a third inner sleeve 90. Third inner sleeve 90 has a slightly smaller diameter than third outer sleeve 88. Third pole 34 presents a third draw hole 92 in third outer sleeve 88 and third inner sleeve 90 for drawing banner attachment cord 44. Further, third inner sleeve 90 includes a third button 94 extending from its surface. Third button 94 (not shown, similar to first button 58) positions at third inner sleeve 90. At the other end, third pole 34 includes a third coupling joint 96. Here, third coupling joint 96 comes in a T-shaped configuration and has a first end 98, a second end 99 and a third end 100. Here, first end 98 receives third outer sleeve 88, second end 99 receives support member 46 and third end 100 receives fourth pole 36. At second end 99 and third end 100, third coupling joint 96 includes a third coupling joint holes 102, 104. Further, third coupling joint 96 includes a third plate 106 extending from the surface of third coupling joint 96 facing inwards. Third plate 106 includes a third plate hole 108. Third plate hole 108 is used to connect banner 16 with the help of banner connecting members 18.

Fourth pole 36 has all the features of first pole 30. In one example, two sets of first poles 30 are provided, where one is used as first pole 30 and other is used as fourth pole 36.

Figure 8:
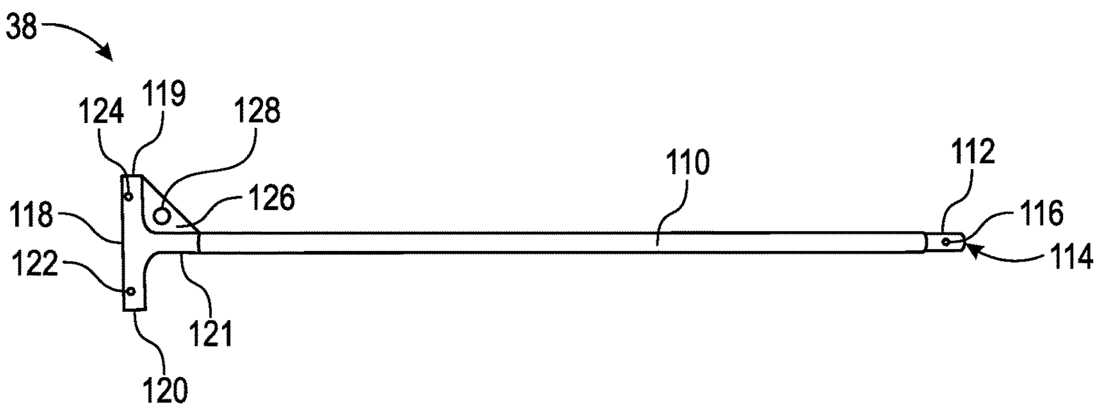
FIG. 8 is a front view of a fifth pole of the banner stand, in accordance with one embodiment of the present invention.

FIG. 8 shows an enlarged view of fifth pole 38, in accordance with one embodiment of the present invention. Fifth pole 38 has the same features as that of third pole 34, with the coupling joint positioned at opposite end of pole, and fifth pole 38 being shorter than third pole 34. As can be seen, fifth pole 38 includes a fifth outer sleeve 110 and a fifth inner sleeve 112. Fifth inner sleeve 112 has a slightly smaller diameter than fifth outer sleeve 110. Fifth pole 38 presents a fifth draw hole 114 in fifth outer sleeve 110 and fifth inner sleeve 112 for drawing banner attachment cord 44. Further, fifth inner sleeve 112 includes a fifth button 116 extending from its surface. Fifth button 116 (not shown, similar to first button 58) positions at fifth inner sleeve 112. At the other end, fifth pole 38 includes a fifth coupling joint 118. Here, fifth coupling joint 118 comes in a T-shaped configuration and has a first end 119, a second end 120 and a third end 121. Here, first end 119 receives fifth outer sleeve 110, second end 120 receives support member 46 and third end 121 receives sixth pole 40. At first end 119 and second end 120, fifth coupling joint 118 includes fifth coupling joint holes 124, 122. Further, fifth coupling joint 118 includes a fifth plate 126 extending from the surface of fifth coupling joint 118 facing inwards. Fifth plate 126 includes a fifth plate hole 128. Fifth plate hole 128 is used to connect banner 16 with the help of banner connecting members 18.

Figure 9:
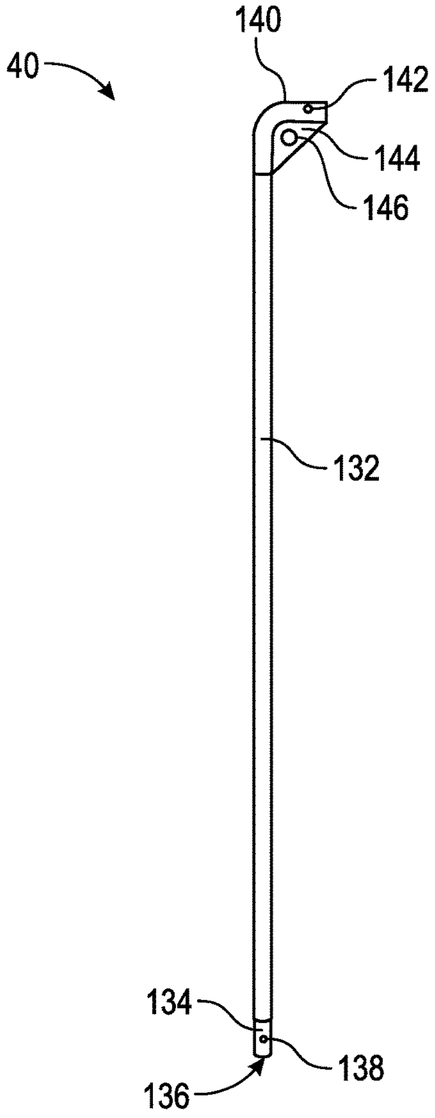
FIG. 9 is a front view of a sixth pole of the banner stand, in accordance with one embodiment of the present invention.

FIG. 9 shows an enlarged view of sixth pole 40, in accordance with one embodiment of the present invention. Sixth pole 40 has the same features as that of second pole 32, with the coupling joint positioned at opposite end of pole, and sixth pole 40 being longer than second pole 32. As can be seen, sixth pole 40 includes a sixth outer sleeve 132 and a sixth inner sleeve 134. Sixth inner sleeve 134 has a slightly smaller diameter than sixth outer sleeve 132. Sixth pole 40 presents a sixth draw hole 136 in sixth outer sleeve 132 and sixth inner sleeve 134 for drawing banner attachment cord 44. Further, sixth inner sleeve 134 includes a sixth button 138 extending from its surface. Sixth button 138 (not shown, similar to first button 58) positions at sixth inner sleeve 134. At the other end, sixth pole 40 includes a sixth coupling joint 140. Here, sixth coupling joint 140 comes in a curved configuration and has a sixth coupling joint hole 142. Further, sixth coupling joint 140 includes a sixth plate 144 extending from the surface of sixth coupling joint 140 facing inwards. Sixth plate 144 includes a sixth plate hole 146. Sixth plate hole 146 is used to connect banner 16 with the help of banner connecting members 18.

Figure 10:
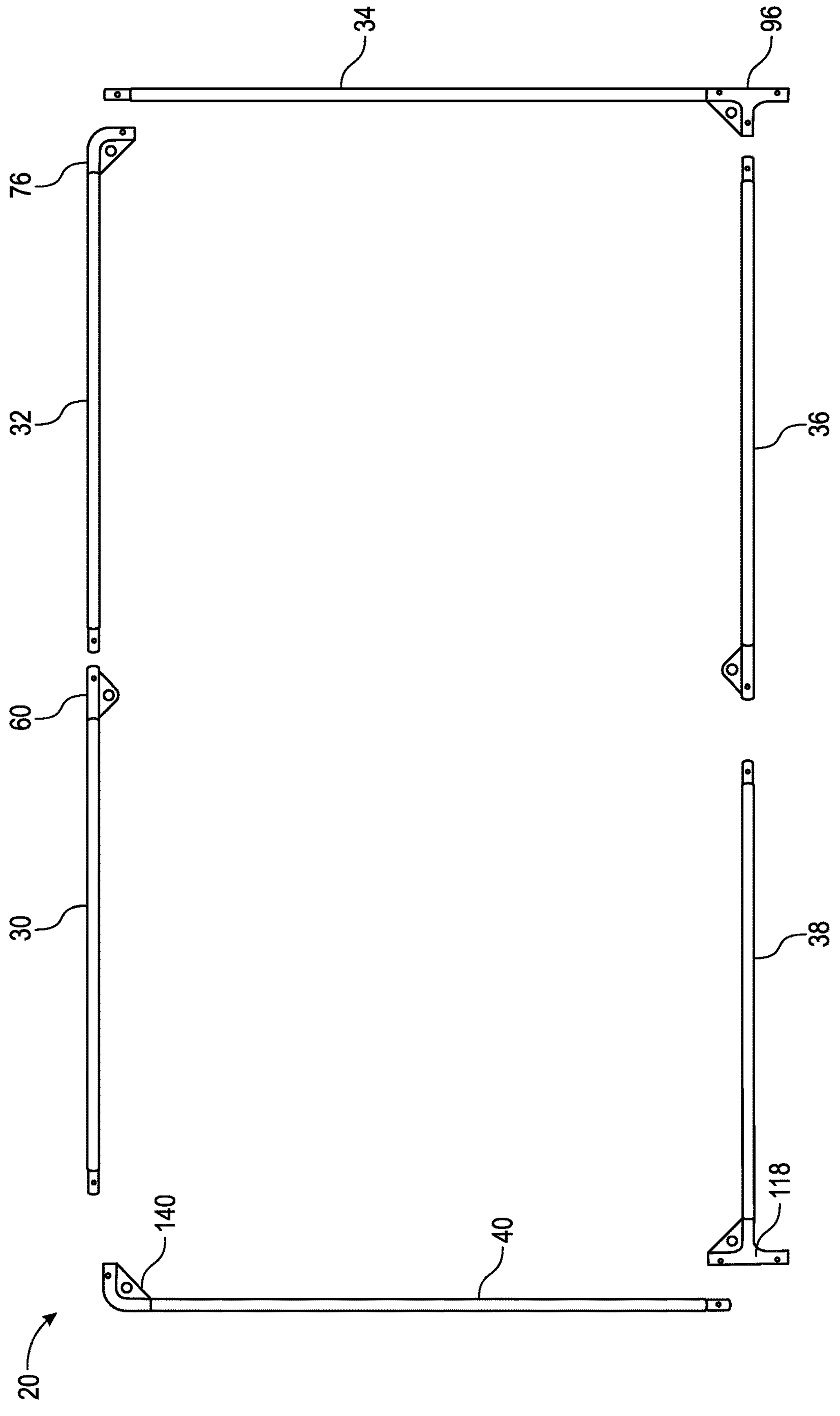
FIG. 10 is an exploded view of a frame structure showing alignment of poles and coupling joints, in accordance with one embodiment of the present invention.

FIG. 10 shows first pole 30, second pole 32, third pole 34, fourth pole 36, fifth pole 38 and sixth pole 40 aligned with each other. As can be seen, first coupling joint 60 aligns with second pole 32. Second coupling joint 76 aligns with third pole 34. Further, third coupling joint 96 aligns with fourth pole 36. Coupling joint of fourth pole 36 aligns with fifth pole 38. Fifth coupling joint 118 aligns with sixth pole 40. Sixth coupling joint 140 aligns with first pole 30.

Figure 11:
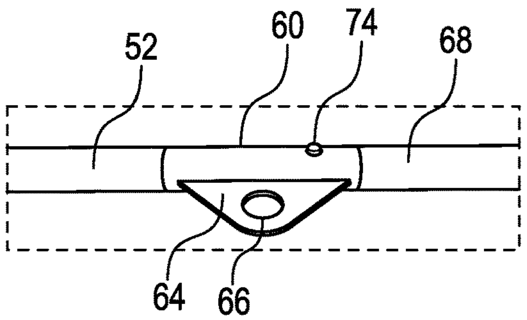
FIG. 11 is a close up view of a first coupling joint connecting the first pole and the second pole, in accordance with one embodiment of the present invention.

Now referring to FIG. 2 and FIG. 11, the coupling of first pole 30 and second pole 32 is explained. As specified above, first coupling joint 60 is permanently fused to the distal end of first outer sleeve 52. At the other end, second inner sleeve 70 inserts into first coupling joint 60 such that second button 74 sits in first coupling joint hole 62 to removably connect first pole 30 and second pole 32. Similarly, fourth pole 36 and fifth pole 38 are connected at the bottom.

Figure 12:
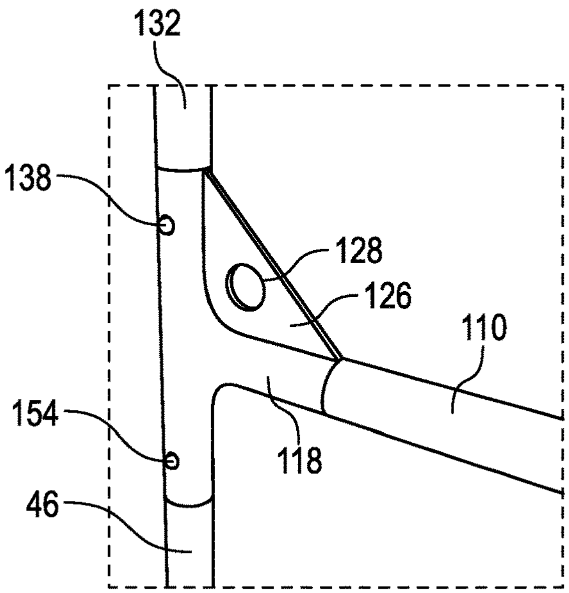
FIG. 12 is a close up view of a fifth coupling joint connecting the fifth pole and the sixth pole, in accordance with one embodiment of the present invention.

Referring to FIG. 2 and FIG. 12, coupling of fifth pole 38, sixth pole 40 and support member 46 at first side 23 is explained. As specified above, fifth coupling joint 118 comes in a T-shaped configuration. Here, first end 119 receives fifth outer sleeve 110, second end 120 receives support member 46, and third end 121 receives sixth pole 40. Similarly, third pole 34, fourth pole 36 and support member 46 at second side 24.

Figure 13:
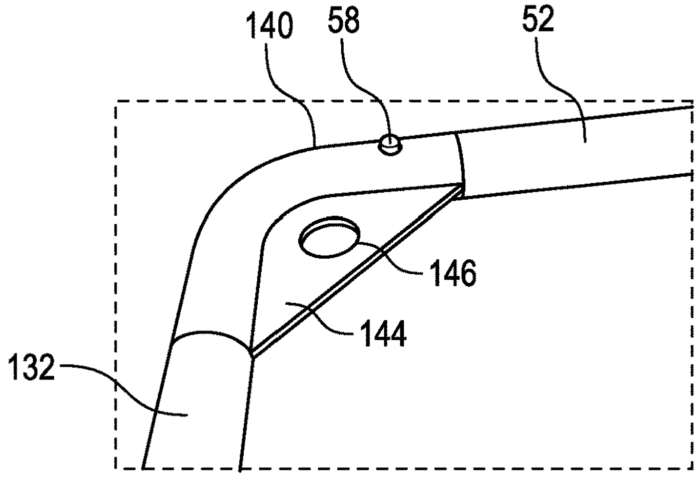
FIG. 13 is a close up view of a sixth coupling joint connecting the first pole and the sixth pole, in accordance with one embodiment of the present invention.

Referring to FIG. 2 and FIG. 13, coupling of sixth pole 40 and first pole 32 is explained. As specified above, sixth coupling joint 140 comes in a curved configuration. Here, sixth coupling joint hole 142 receives first button 58 of first inner sleeve 54. Similarly, second coupling joint 76 connects second pole 34 and third pole 36.

A person skilled in the art understands that poles 30, 32, 34, 36, 38, 40 have fixed shapes with varying lengths. Further, poles 30, 32, 34, 36, 38, 40 are fused to coupling joints 60, 76, 96, 60, 118, 140 on one end and with their respective inner sleeve on the other end interlocking with the adjacent coupling joint in the next sequence. This series of interlocking poles and coupling joints repeats until frame structure 20 is complete.

Figure 14:
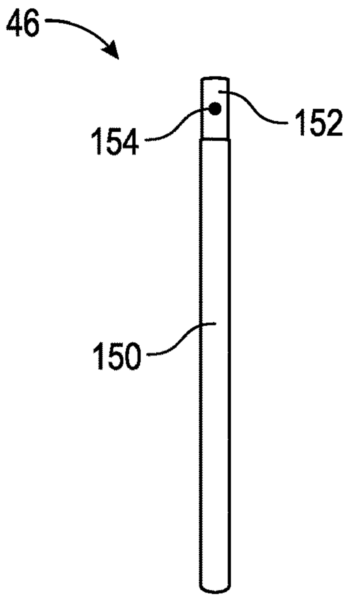
FIG. 14 is a front view of a support member, in accordance with one embodiment of the present invention.

FIG. 14 shows a front view of support member 46, in accordance with one embodiment of the present invention. Each support member 46 indicates a leg connected between frame structure 20 and spike member 48. In one example, support member 46 includes open end joints that interlock with frame structure 20 and spike member 48. Support member 46 includes a seventh outer sleeve 150 and a seventh inner sleeve 152 extending from seventh outer sleeve 150. Seventh inner sleeve 152 includes a seventh button 154. In order to connect support member 46 to third coupling joint 96, seventh inner sleeve 152 inserts in third coupling joint 96 such that seventh button 154 sits in third coupling joint hole 102. Similarly, support member 46 connects to fifth coupling joint 118, seventh inner sleeve 152 inserts in fifth coupling joint 118 such that seventh button 154 sits in fifth coupling joint hole 122. It should be understood that support members 46 removably connect to third coupling joint 96 and fifth coupling joint 118 at sides 23, 24.

Figure 15:
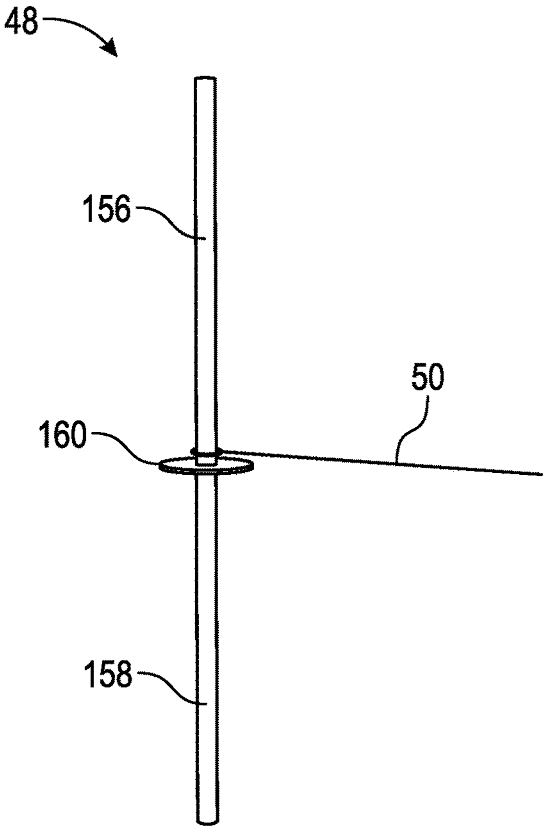
FIG. 15 is a front view of a spike member, in accordance with one embodiment of the present invention.

FIG. 15 shows a front view of spike member 48, in accordance with one embodiment of the present invention. Spike member 48 includes an upper part 156 and a lower part 158. In one example, spike member 48 includes a connecting member 160 at its substantially half-length. Connecting member 160 indicates a metal cylinder with circular guard halfway between either end/part. Connecting member 160 ensures that spike member 48 is driven the appropriate distance into the ground 14. Each spike member 48 is tied to one another with a piece of non-elastic cable 50 that measures the same width as the frame's outermost edges. Cable 50 acts as a guide to position each spike member 48 at the appropriate distance from one other to ensure alignment with support member 46 and frame structure 20.

In accordance with the present invention, lower part 158 is made to sit on surface 14 to provide required support for positioning banner stand 12 in an upstanding position, as shown in FIG. 1, for example. Upper part 156 is exposed and is used to connect support members 46. Specifically, support members 46 is slid into spike members 48 and are made to lock in place. A person skilled in the art understands that support members 46 removably connect to spike members 48 without the need for additional joints, couplings, or pieces. Subsequently, frame structure 20 is connected to support members 46, as explained above.

Figure 16:
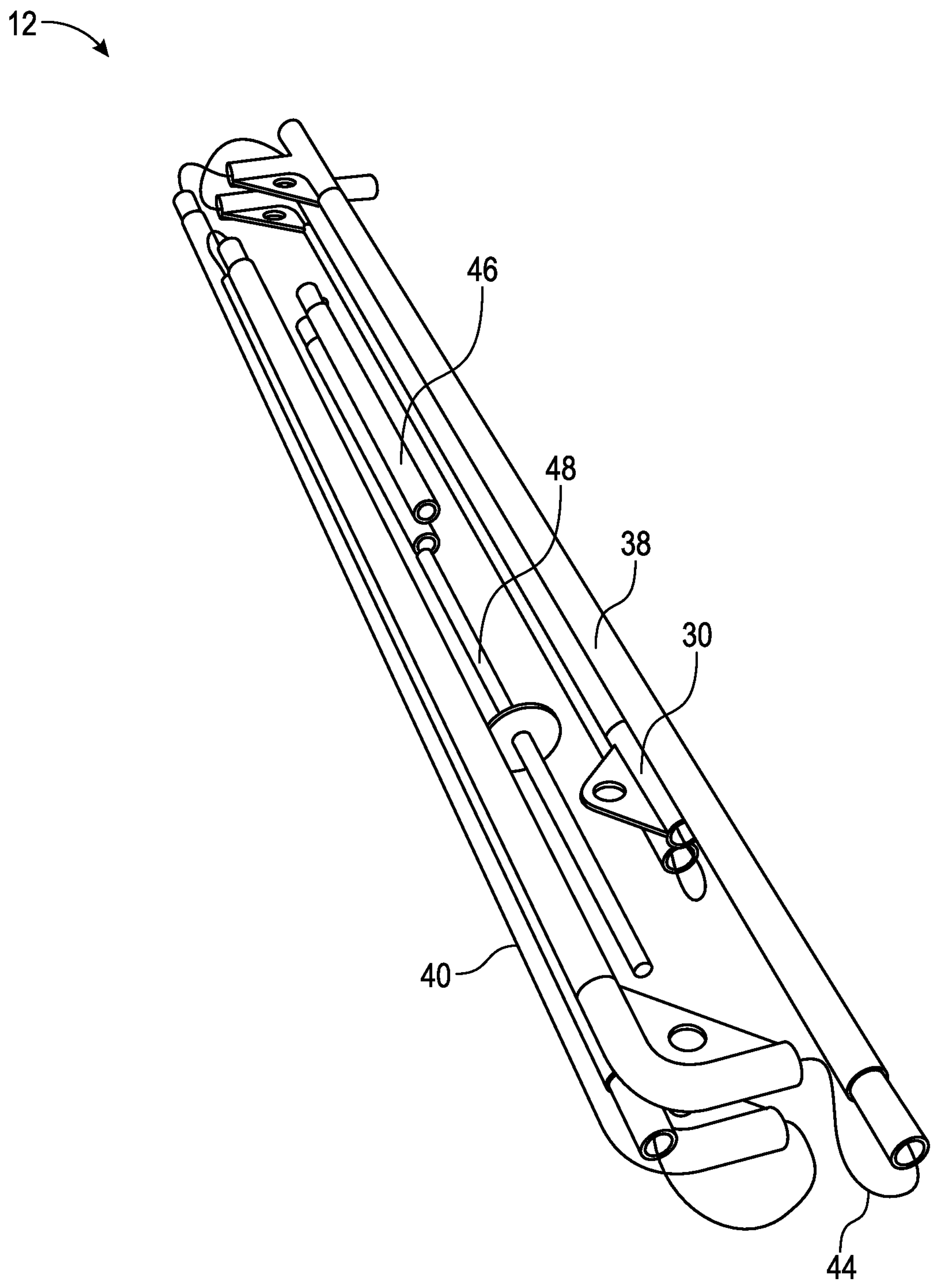
FIG. 16 is a collapsed view of the banner stand, in accordance with one embodiment of the present invention.

After use, frame structure 20 is uninstalled from support members 46. As specified above, frame structure 20 includes banner attachment cord 44 drawn through each of first pole 30, second pole 32, third pole 34, fourth pole 36, fifth pole 38 and sixth pole 40. When uninstalled, first pole 30, second pole 32, third pole 34, fourth pole 36, fifth pole 38 and sixth pole 40 come apart while being connected via banner attachment cord 44. Further, support members 46 are uninstalled from spike members 48. Subsequently, spike members 48 are pulled out from surface 14. FIG. 16 shows the feature of banner stand 12 uninstalled and collapsed after use, in accordance with one exemplary embodiment of the present invention.

The embodiments provide for several advantages over the prior art. For example, the banner stand is stable enough to withstand external conditions, collapsible for easy transport and storage, and sturdy to hold various sizes and weights of banners, and is lightweight. The banner stand offers an easy way to hang banners and signs. The banner stand is lightweight and strong enough to hold its shape outdoors. The banner stand offers a frame structure having a series of poles and coupling joints that interlock with one another. The poles and coupling joints are maintained in a sequential order with the help of a continuous elastic rope that draws through the poles and the coupling joints. The elastic rope helps the poles and coupling joints to be held in a sequential order even when the poles and the coupling joints are uninstalled. The banner stand includes a plurality of plates having holes. The plates present holding points to secure different signs.

Clause 1. A banner stand, comprising: a frame structure having: a plurality of poles; a plurality of coupling joints, each coupling joint positioned at one end of a pole of the plurality of poles, wherein the plurality of poles and the plurality of coupling joints interconnect forming a banner receiving area, wherein a coupling joint of the plurality of coupling joints comprises a plate having a hole, wherein the plate faces the banner receiving area; and an elastic cord drawn through the plurality of poles and the plurality of coupling joints to maintain a sequential order of the plurality of poles and the plurality of coupling joints; and spike members connecting at a bottom of the frame structure, wherein the spike members are designed to penetrate ground to help position the frame structure in an upright position, wherein the banner receiving area receives a banner, and wherein the frame structure comprises a banner attachment cord drawn through the holes in the plates for connecting the banner.

Clause 2. The banner stand of Clause 1, wherein each of the pole comprises a telescopic pole.

Clause 3. The banner stand of Clause 1, wherein each of the pole comprises a telescopic pole having an outer sleeve and an inner sleeve, wherein the outer sleeve has a larger diameter than the inner sleeve, and wherein the inner sleeve extends from the outer sleeve.

Clause 4. The banner stand of Clause 3, wherein the inner sleeve comprises a spring member positioned therein, and wherein the inner sleeve further comprises a button connecting the spring member.

Clause 5. The banner stand of Clause 4, wherein each of the plurality of coupling joints comprises a coupling joint hole, wherein the inner sleeve inserts in the coupling joint positioned adjacently such that the button sits in the coupling joint hole, and wherein the button presses to install and uninstall the inner sleeve from the coupling joint via the coupling joint hole.

Clause 6. The banner stand of Clause 3, wherein the coupling joint of the plurality of coupling joints is fused to the outer sleeve of respective the pole.

Clause 7. The banner stand of Clause 1, wherein the coupling joint has a straight configuration to join the poles positioned adjacent to each other at a top and bottom of the frame structure.

Clause 8. The banner stand of Clause 1, wherein the coupling joint has a curved configuration to join the poles positioned at corners at a top of the frame structure.

Clause 9. The banner stand of Clause 1, wherein the coupling joint has a T-shaped configuration to join the poles positioned at the bottom, and wherein the spike members connect to the coupling joint having the T-shaped configuration.

Clause 10. The banner stand of Clause 1, further comprises: support members, wherein support members connect in between the frame structure and the spike members; a cable connecting the spike members, the cord having a predetermined length to set a maximum distance between the spike members.

Clause 11. The banner stand of Clause 10, wherein the support members include telescopic poles.

Clause 12. The banner stand of Clause 1, wherein the frame structure is uninstalled and collapsed while maintaining the plurality of poles and the plurality of coupling joints in a series with the help of the elastic cord.

Clause 13. The banner stand of Clause 1, wherein the plate has a trianguloid configuration facing a center of the banner receiving area.

Clause 14. A banner stand, comprising: a frame structure having: a plurality of poles; a plurality of coupling joints, each coupling joint positioned at one end of a pole of the plurality of poles, wherein the plurality of poles and the plurality of coupling joints interconnect forming a banner receiving area, wherein a coupling joint of the plurality of coupling joints comprises a plate having a hole, wherein the plate faces the banner receiving area; and an elastic cord drawn through the plurality of poles and the plurality of coupling joints to maintain a sequential order of the plurality of poles and the plurality of coupling joints; support members connecting at a bottom of the frame structure; and spike members connecting at the bottom of the frame structure, wherein the spike members are designed to penetrate ground to help position the frame structure in an upright position, wherein the banner receiving area receives a banner, and wherein the frame structure comprises a banner attachment cord drawn through the holes in the plates for connecting the banner.

Clause 15. The banner stand of Clause 14, wherein the coupling joint has a straight configuration to join the poles positioned adjacent to each other at a top and bottom of the frame structure.

Clause 16. The banner stand of Clause 14, wherein the coupling joint has a curved configuration to join the poles positioned at corners at a top of the frame structure.

Clause 17. The banner stand of Clause 14, wherein the coupling joint has a T-shaped configuration to join the poles positioned at the bottom, and wherein the spike members connect to the coupling joint having the T-shaped configuration.

Clause 18. The banner stand of Clause 14, wherein each of the pole comprises a telescopic pole having an outer sleeve and an inner sleeve, wherein the outer sleeve has a larger diameter than the inner sleeve, wherein the inner sleeve extends from the outer sleeve, wherein the inner sleeve comprises a spring member positioned therein, and wherein the inner sleeve further comprises a button connecting the spring member.

Clause 19. The banner stand of Clause 18, wherein each of the plurality of coupling joints comprises a coupling joint hole, wherein the inner sleeve inserts in the coupling joint positioned adjacently such that the button sits in the coupling joint hole, and wherein the button presses to install and uninstall the inner sleeve from the coupling joint via the coupling joint hole.

Clause 20. A method of providing a banner stand, the method comprising steps of: providing a frame structure having a plurality of poles; providing a plurality of coupling joints, each coupling joint positioned at one end of a pole of the plurality of poles, the plurality of poles and the plurality of coupling joints interconnecting for forming a banner receiving area, each of the coupling joint comprising a plate having a hole, each of the plate facing the banner receiving area; providing an elastic cord drawn through the plurality of poles and the plurality of coupling joints for maintaining a sequential order of the plurality of poles and the plurality of coupling joints; providing spike members connecting at the bottom of the frame structure, the members going into a ground and helping for positioning the frame structure in an upright position; receiving a banner in the banner receiving area; and providing a banner attachment cord drawn through the holes in the plates for connecting the banner.

While the invention has been described in terms of exemplary embodiments, it is to be understood that the words that have been used are words of description and not of limitation. As is understood by persons of ordinary skill in the art, a variety of modifications can be made without departing from the scope of the invention defined by the following claims, which should be given their fullest, fair scope.

What is claimed is:

1. A banner stand, comprising:

a frame structure having:

i) a plurality of poles;

ii) a plurality of coupling joints, each coupling joint positioned at one end of a pole of the plurality of poles, wherein the plurality of poles and the plurality of coupling joints interconnect forming a banner receiving area, wherein a coupling joint of the plurality of coupling joints comprises a plate having a hole, wherein the plate faces the banner receiving area; and iii) an elastic cord drawn through the plurality of poles and the plurality of coupling joints to maintain a sequential order of the plurality of poles and the plurality of coupling joints; and spike members connecting at a bottom of the frame structure, wherein the spike members are designed to penetrate ground to help position the frame structure in an upright position, wherein the banner receiving area receives a banner, and wherein the frame structure comprises a banner attachment cord drawn through the holes in the plates for connecting the banner.

2. The banner stand of claim 1, wherein each of the pole comprises a telescopic pole.

3. The banner stand of claim 1, wherein each of the pole comprises a telescopic pole having an outer sleeve and an inner sleeve, wherein the outer sleeve has a larger diameter than the inner sleeve, and wherein the inner sleeve extends from the outer sleeve.

4. The banner stand of claim 3, wherein the inner sleeve comprises a spring member positioned therein, and wherein the inner sleeve further comprises a button connecting the spring member.

5. The banner stand of claim 4, wherein each of the plurality of coupling joints comprises a coupling joint hole, wherein the inner sleeve inserts in the coupling joint positioned adjacently such that the button sits in the coupling joint hole, and wherein the button presses to install and uninstall the inner sleeve from the coupling joint via the coupling joint hole.

6. The banner stand of claim 3, wherein the coupling joint of the plurality of coupling joints is fused to the outer sleeve of respective the pole.

7. The banner stand of claim 1, wherein the coupling joint has a straight configuration to join the poles positioned adjacent to each other at a top and bottom of the frame structure.

8. The banner stand of claim 1, wherein the coupling joint has a curved configuration to join the poles positioned at corners at a top of the frame structure.

9. The banner stand of claim 1, wherein the coupling joint has a T-shaped configuration to join the poles positioned at the bottom, and wherein the spike members connect to the coupling joint having the T-shaped configuration.

10. The banner stand of claim 1, further comprises:

support members, wherein support members connect in between the frame structure and the spike members;

a cable connecting the spike members, the cable having a predetermined length to set a maximum distance between the spike members.

11. The banner stand of claim 10, wherein the support members include telescopic poles.

12. The banner stand of claim 1, wherein the frame structure is uninstalled and collapsed while maintaining the plurality of poles and the plurality of coupling joints in a series with the help of the elastic cord.

13. The banner stand of claim 1, wherein the plate has a trianguloid configuration facing a center of the banner receiving area.

14. A banner stand, comprising:

a frame structure having:

i) a plurality of poles;

ii) a plurality of coupling joints, each coupling joint positioned at one end of a pole of the plurality of poles, wherein the plurality of poles and the plurality of coupling joints interconnect forming a banner receiving area, wherein a coupling joint of the plurality of coupling joints comprises a plate having a hole, wherein the plate faces the banner receiving area; and iii) an elastic cord drawn through the plurality of poles and the plurality of coupling joints to maintain a sequential order of the plurality of poles and the plurality of coupling joints;

support members connecting at a bottom of the frame structure; and spike members connecting at the bottom of the frame structure, wherein the spike members are designed to penetrate ground to help position the frame structure in an upright position, wherein the banner receiving area receives a banner, and wherein the frame structure comprises a banner attachment cord drawn through the holes in the plates for connecting the banner.

15. The banner stand of claim 14, wherein the coupling joint has a straight configuration to join the poles positioned adjacent to each other at a top and bottom of the frame structure.

16. The banner stand of claim 14, wherein the coupling joint has a curved configuration to join the poles positioned at corners at a top of the frame structure.

17. The banner stand of claim 14, wherein the coupling joint has a T-shaped configuration to join the poles positioned at the bottom, and wherein the spike members connect to the coupling joint having the T-shaped configuration.

18. The banner stand of claim 14, wherein each of the pole comprises a telescopic pole having an outer sleeve and an inner sleeve, wherein the outer sleeve has a larger diameter than the inner sleeve, wherein the inner sleeve extends from the outer sleeve, wherein the inner sleeve comprises a spring member positioned therein, and wherein the inner sleeve further comprises a button connecting the spring member.

19. The banner stand of claim 18, wherein each of the plurality of coupling joints comprises a coupling joint hole, wherein the inner sleeve inserts in the coupling joint positioned adjacently such that the button sits in the coupling joint hole, and wherein the button presses to install and uninstall the inner sleeve from the coupling joint via the coupling joint hole.

20. A method of providing a banner stand, the method comprising steps of:

providing a frame structure having a plurality of poles;

providing a plurality of coupling joints, each coupling joint positioned at one end of a pole of the plurality of poles, the plurality of poles and the plurality of coupling joints interconnecting for forming a banner receiving area, each of the coupling joint comprising a plate having a hole, each of the plate facing the banner receiving area;

providing an elastic cord drawn through the plurality of poles and the plurality of coupling joints for maintaining a sequential order of the plurality of poles and the plurality of coupling joints;

providing spike members connecting at the bottom of the frame structure, the members going into a ground and helping for positioning the frame structure in an upright position;

receiving a banner in the banner receiving area; and providing a banner attachment cord drawn through the holes in the plates for connecting the banner.

* * * * *